United States Patent
Simske et al.

(10) Patent No.: US 9,251,459 B2
(45) Date of Patent: Feb. 2, 2016

(54) RFID ANTENNA AND 2D BARCODE

(75) Inventors: Steven J Simske, Fort Collins, CO (US); Jason S Aronoff, Fort Collins, CO (US); Makarand P Gore, Fort Collins, CO (US); Rachel Ann Stamey, Fort Collins, CO (US); Moira Eagan, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/808,955

(22) PCT Filed: Jul. 9, 2010

(86) PCT No.: PCT/US2010/041445
§ 371 (c)(1),
(2), (4) Date: Jan. 8, 2013

(87) PCT Pub. No.: WO2012/005733
PCT Pub. Date: Jan. 12, 2012

(65) Prior Publication Data
US 2013/0105587 A1    May 2, 2013

(51) Int. Cl.
*G06K 19/08* (2006.01)
*G06K 19/077* (2006.01)

(52) U.S. Cl.
CPC ........ *G06K 19/083* (2013.01); *G06K 19/07749* (2013.01)

(58) Field of Classification Search
CPC ................. G06K 19/07749; G06K 19/06018; G06K 19/0776; G06K 19/083; B32B 2519/02; B32B 2425/00
See application file for complete search history.

(56) References Cited

U.S. PATENT DOCUMENTS

| | | | |
|---|---|---|---|
| 6,603,400 B1 * | 8/2003 | Shoobridge | 340/572.1 |
| 7,284,704 B2 | 10/2007 | Lubow | |
| 7,546,948 B2 | 6/2009 | Maranov | |
| 8,096,479 B2 * | 1/2012 | Iyengar et al. | 235/487 |
| 2006/0186204 A1 * | 8/2006 | Lubow | 235/462.01 |
| 2006/0219797 A1 * | 10/2006 | Koyama et al. | 235/492 |
| 2007/0057054 A1 | 3/2007 | Maranov | |
| 2008/0013299 A1 * | 1/2008 | Renn | 361/818 |
| 2008/0190561 A1 * | 8/2008 | Sanbongi et al. | 156/361 |
| 2009/0039162 A1 * | 2/2009 | Yen | 235/462.11 |
| 2010/0090008 A1 | 4/2010 | Bashan et al. | |
| 2011/0017834 A1 * | 1/2011 | Schulze-Hagenest et al. | 235/492 |

(Continued)

FOREIGN PATENT DOCUMENTS

| | | | |
|---|---|---|---|
| CN | 101479740 A | | 7/2009 |
| JP | 2000-000228 | | 3/2000 |
| JP | 2006107296 A | * | 4/2006 |

OTHER PUBLICATIONS

International Search Report and Written Opinion issued in internation Application No. PCT/US2010/041445 (mailed Mar. 29, 2011).

(Continued)

*Primary Examiner* — Sonji Johnson
(74) *Attorney, Agent, or Firm* — Law Office of Philip Scott Lyren (57) ABSTRACT

An apparatus has a surface that includes a two dimensional barcode and a Radio Frequency Identification (RFID) antenna printed on the two dimensional barcode. The RFID antenna and the two dimensional barcode are formed from a conductive ink.

13 Claims, 4 Drawing Sheets

(56) References Cited

U.S. PATENT DOCUMENTS

2011/0062237 A1* 3/2011 Chaves .................. 235/454
2012/0140333 A1* 6/2012 Tomczyk et al. ............ 359/619

OTHER PUBLICATIONS

People Republic China IPO Search Report, issued Mar. 31, 2015, in related China application 201080069039.9.

* cited by examiner

RFID ANTENNA AND 2D BARCODE

FIELD OF THE INVENTION

The present invention relates to a combined RFID antenna and a 2D barcode.

BACKGROUND

Different mechanisms exist for identifying and tracking products. For example, some products include a Radio Frequency Identification (RFID) tag that has an integrated circuit for storing and processing information and an antenna for receiving and transmitting signals. Other products include a barcode that has an optical machine-readable representation of data patterned in two dimensions (2D). An optical scanner reads the barcode to retrieve product identification information.

RFID tags and barcodes can be expensive to produce since they require a variety of different components and processes to manufacture.

SUMMARY OF THE INVENTION

One embodiment is an apparatus that has a surface that includes a two dimensional barcode and a Radio Frequency Identification (RFID) antenna printed on the two dimensional barcode. The RFID antenna and the two dimensional barcode are formed from a conductive ink.

DETAILED DESCRIPTION

Example embodiments relate to apparatus and methods that combine a RFID antenna and a 2D barcode. Conductive loops (or lines segments/bars) of the antenna are superimposed or overlaid on printed portions of the 2D barcode.

One example embodiment produces an RFID chip with an antenna and 2D barcode. The antenna and 2D barcode are printed together in a single pass with a printing technique during manufacturing. Conductivity of the antenna is then applied in a second pass. This process reduces costs and complexities of the process since the antenna and 2D barcode are simultaneously produced.

In one example embodiment, the RFID antenna and the barcode are made using the same ink, which simplifies the printing and finishing processes of the RFID chip or tag and 2D barcode. One example embodiment cures the ink with a pattern directed approach, such as Lightscribe laser annealing.

In one example embodiment, the RFID antenna follows the ink deposited as the 2D barcode. As another example, RFID-loops (enabling inductive read/write operations) are deposited in thin strips that are either ignored by a barcode reader or handled by an error-correcting code (ECC) associated with barcode symbology. In other words, the closed loops of the antenna have a size or surface area (length and/or width) such that signal or field generated by these loops is ignored by a barcode reader and/or corrected with ECC.

RFIDs in accordance with an example embodiment are manufactured with a layered (near-field RFID antenna and RFID chip/dielectric layer/far-field antenna) approach. The RFID antennae is integrally printed with the 2D barcode and used to provide an upper layer (far-field RFID antenna) that gives both far-field RFID readability and 2D barcode readability Example embodiments are not limited to printing the antenna and barcode. For instance, example embodiments are also applied to the production of membrane switches and other printed electronic interlaces where the metallic appearance covers a different pattern than the requisite connecting wires.

Example embodiments utilize a single ink for both the barcode and RFID antenna. Example inks include, but are not limited to, transparent conductive inks, such as ITO or Indium Tin Oxide or other electrically conductive inks. Even though an ink may be transparent, it can be read with an off-the-shelf barcode reader. Reading occurs due to the differential absorption and/or reflection by the barcode reader's illumination lamp/bulb/LED of the substrate and the ink. This principle is used to read white Indigo inks (Electrolnks) over white substrates for instance. White substrates typically have brighteners and are less absorptive than the ElectroInk.

One example embodiment prints the antenna and 2D barcode with a pre-conductive ink. As used herein and in the claims, a "pre-conductive ink" is an ink that is applied and whose conductivity subsequently increases, for example, by curing with heat, ultra violet (UV) light, laser ablation, or other means. For example, the ink is applied in an electrically non-conductive state and then cured to an electrically conductive state. Alternatively, conductive ink is applied which does not utilize subsequent curing.

In one embodiment, the 2D barcode is affixed directly to the RFID chip and is able to support Induced currents. Instead of a far-field antenna, the induced electric field in the closed loops of the antenna induces currents in a nearby near-field antenna that is itself affixed to an RFID chip.

Figure 1A:
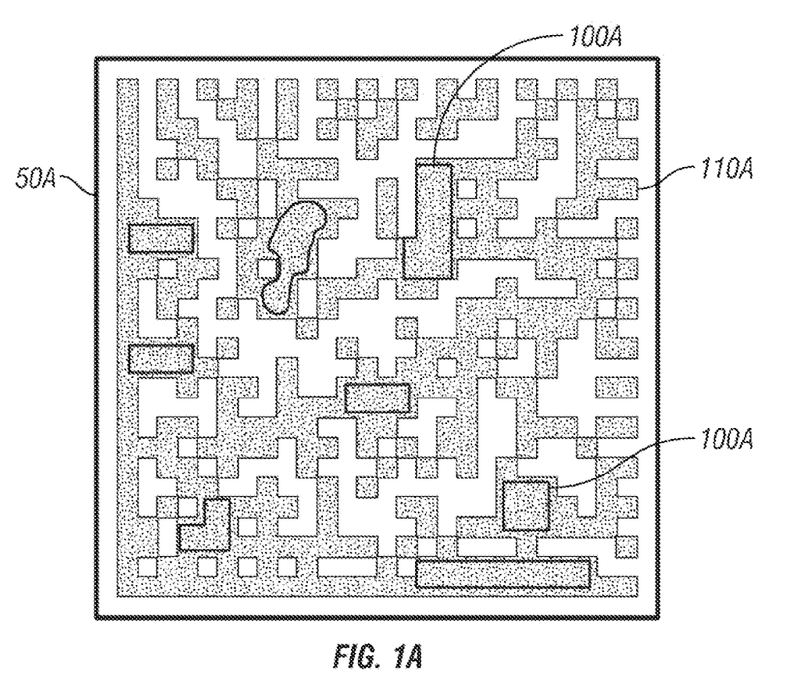
FIG. 1A shows a first example pattern of overlaying conductive traces of an antenna on a 2D barcode in accordance with an example embodiment.
Figure 1B:
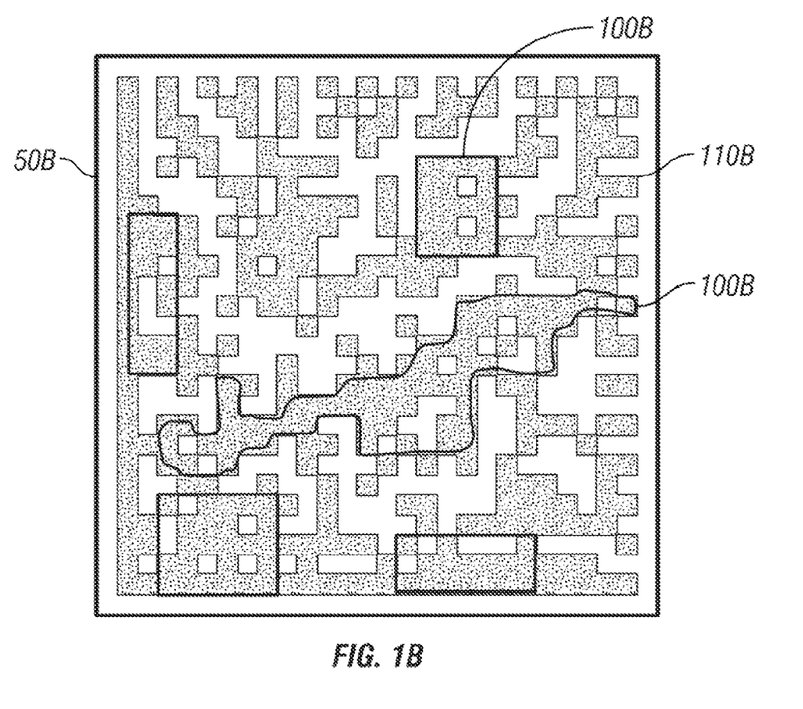
FIG. 1B shows a second example pattern of overlaying conductive traces of an antenna on a 2D barcode in accordance with an example embodiment.
Figure 1C:
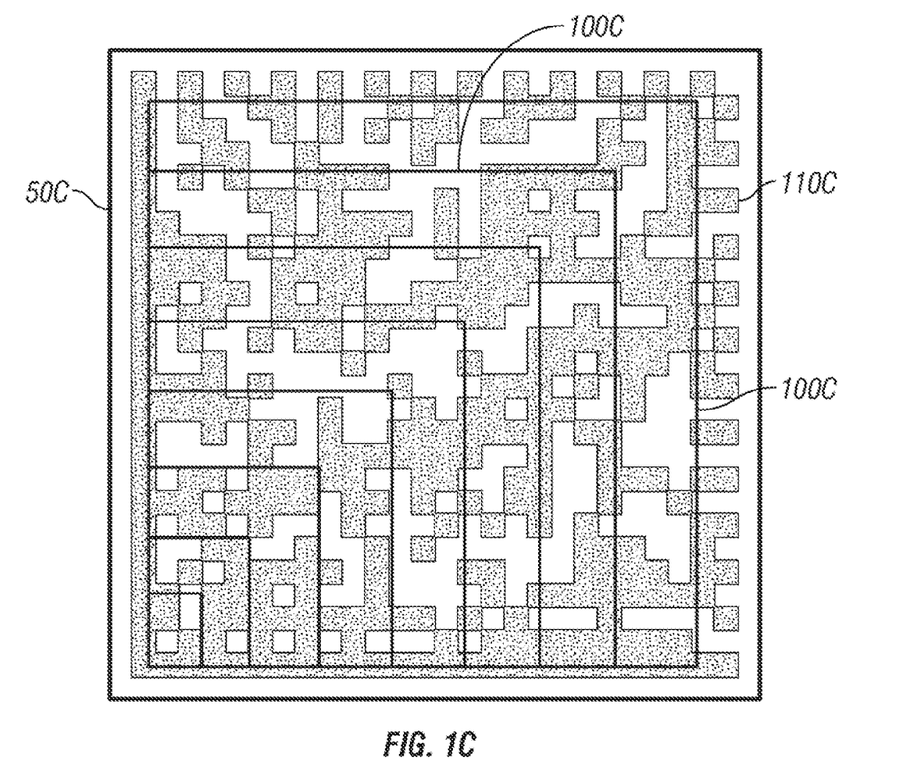
FIG. 1C shows a third example pattern of overlaying conductive traces of an antenna on a 2D barcode in accordance with an example embodiment.

Example embodiments include a variety of different patterns for overlaying or combining the conductive traces of the antenna with the 2D barcode. FIGS. 1A-1C show three different example patterns.

FIG. 1A shows an apparatus 50A with a first example pattern of overlaying conductive traces or closed loops 100A of an antenna on a 2D barcode 110B in accordance with an example embodiment.

In this embodiment, the conductive pathways or loops are created or exist only where the printed (non-white) elements of the 2D barcode are present. For example, the loops are printed on top of the barcodes to co-exist with the barcodes. Here, the conductive loops 110A overlay or exist entirely on the printed (black) elements of the 2D barcodes. In other words, the conductive loops do not extend onto white areas or areas between individual elements 120A of the 2D barcode 110A.

FIG. 1B shows an apparatus 50B with a second example pattern of overlaying conductive traces or closed loops 100B of an antenna on a 2D barcode 110B in accordance with an example embodiment.

In this embodiment, the conductive pathways or loops are created above the black ink or along boundaries of black and white ink in the 2D barcode 110B. Multiple conductive loops (rectangular and generally curve) are shown that overlay black pixels and/or the boundaries between black and white pixels of the 2D barcode. As shown, none of the loops cross open white space, but such loops can widen points of connection between patches or elements of the barcode.

In FIGS. 1A and 1B, the closed loops of the antenna have shapes that follow or track the ink deposits that form the barcode. The size and shape of these loops can vary (such as being circular, rectangular, square, polygonal, etc.) depending on the pattern of the dark areas of the barcode.

FIG. 1C shows an apparatus 50C with a third example pattern of overlaying conductive traces or closed loops 100C of an antenna on a 2D barcode 110C in accordance with an example embodiment.

In this embodiment, the conductive loops are printed without any particular regard to the location of the black ink (with the exception being the alternating black and white tiles along the top and left edges of the 2D barcode). The example shown in FIG. 1C can be read with an off-the-shelf barcode reader. Readability of the 2D barcode occurs in spite of the superimposed lines of the RFID antenna. In one embodiment, reading of the barcode in spite of the antenna loops occurs as a function of an error-code correction (ECC) algorithm, percentage of loops versus barcode area used during the production of the barcode, and the thickness of the conductive traces used for the antenna.

In FIGS. 1A-1C, the lines of the antenna and darkened areas or tiles of the barcode are printed with the same ink. Example embodiments include lines of the antenna having different lengths and widths. For example, the lines of the antenna can be approximately half the thickness of the individual modules of the barcode. As another example, the lines of the antenna can have widths of 0.25 mm, 0.5 mm, and 1.0 mm width, with laser annealing of the traces and air drying on the ink around the traces.

It should be noted that the orientation markers (the large outlining "L" of the barcodes) of the 2D barcodes can also serve as antennae that provide no interference with the readable modules.

The apparatus 50A-50C include, but are not limited to, a product such as an electronic or non-electronic device), an RFID or other tracking device that connects or attaches to a product, portable or movable devices that are sold and/or tracked. In one embodiment, the RFID antenna and barcode are affixed, deposited, and/or applied to a surface, such as a surface of the product or separate element of the apparatus that attaches to the product (e.g., a tracking device).

Figure 2:
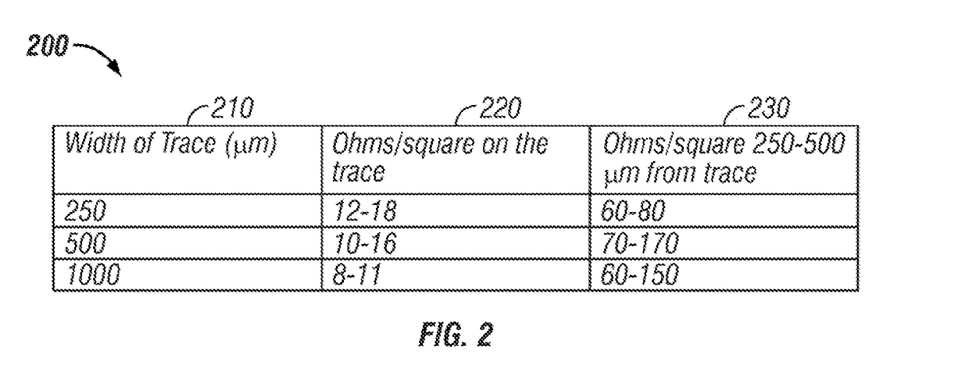
FIG. 2 shows a table with electrical properties for different widths of antenna lines in accordance with an example embodiment.

FIG. 2 shows a table 200 with electrical properties for different widths of antenna lines. A first column 210 shows width of traces: a second column 220 shows ohms per square on the traces; and a third column 230 shows ohms per square 250-500 micrometers from the trace.

In accordance with table 200, curing with a 405 nm laser annealing results in a 5 to 10 times conductivity difference with effective antenna traces of 500 μm or less. This corresponds to 1/50 of an inch, or 20 mils, which would allow reading from barcodes with module sizes of 40 mils or less for overwriting as described in FIG. 1C.

Figure 3:
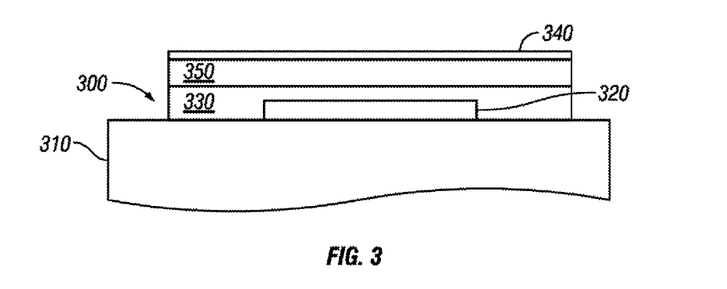
FIG. 3 shows an RFID chip secured to a product in accordance with an example embodiment.

FIG. 3 shows an RFID chip 300 secured to a product 310 in accordance with an example embodiment. The RFID chip 300 includes an integrated circuit 320 in or on a first layer 330 and a combination RFID antenna and barcode 340 on a second layer 350. The combination RFD antenna and barcode 340 includes, but is not limited to, the embodiments shown in FIGS. 1A-1C.

Figure 4:
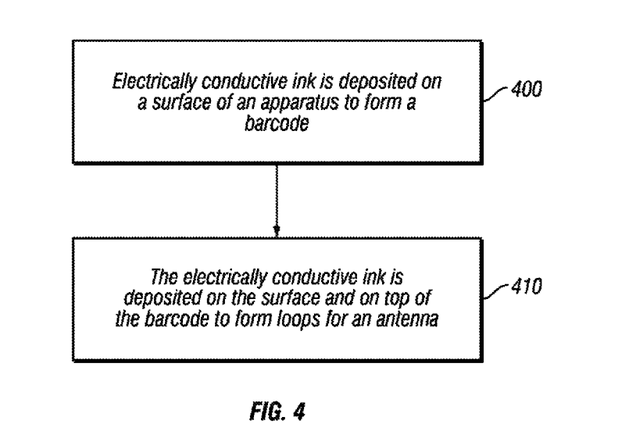
FIG. 4 is a method for applying a conductive ink to a surface to form loops for an antenna and a barcode.

FIG. 4 is a method for applying conductive ink to a surface to form loops for an antenna and a barcode.

According to block 400, electrically conductive ink is deposited on a surface of an apparatus to form a barcode.

According to block 410, the electrically conductive ink is deposited on the surface and on top of the barcode to form loops for an antenna.

In one embodiment, the loops and barcode are formed at a same time. In another embodiment, the barcodes are formed and then the loops are subsequently formed on the barcodes. In yet another embodiment, the loops are formed and then the barcode is subsequently formed on the loops.

In one embodiment, the RFID antenna and barcode are deposited on the surface in a single print operation with ink that is electrically conductive. Since the antenna and barcode are superimposed on each other and co-exist, an overall surface area for the antenna and barcode is reduced.

Example embodiments also provide flexibility in a supply chain since 2D barcodes are printed with overlying RFID antenna, while not including an ite level RFID on all units (a model for supply chain inference is discussed in connection with FIG. 5).

Example embodiments can be utilized with supply chain inference. Supply chain inference, as it applies to serialization, refers to the ability to associate unique identifiers (e.g., RFID chips) on each item in an aggregation with the aggregator (case, pallet, other shipping unit). Usually this implies a hierarchical relationship between the aggregator and each individual item.

Figure 5:
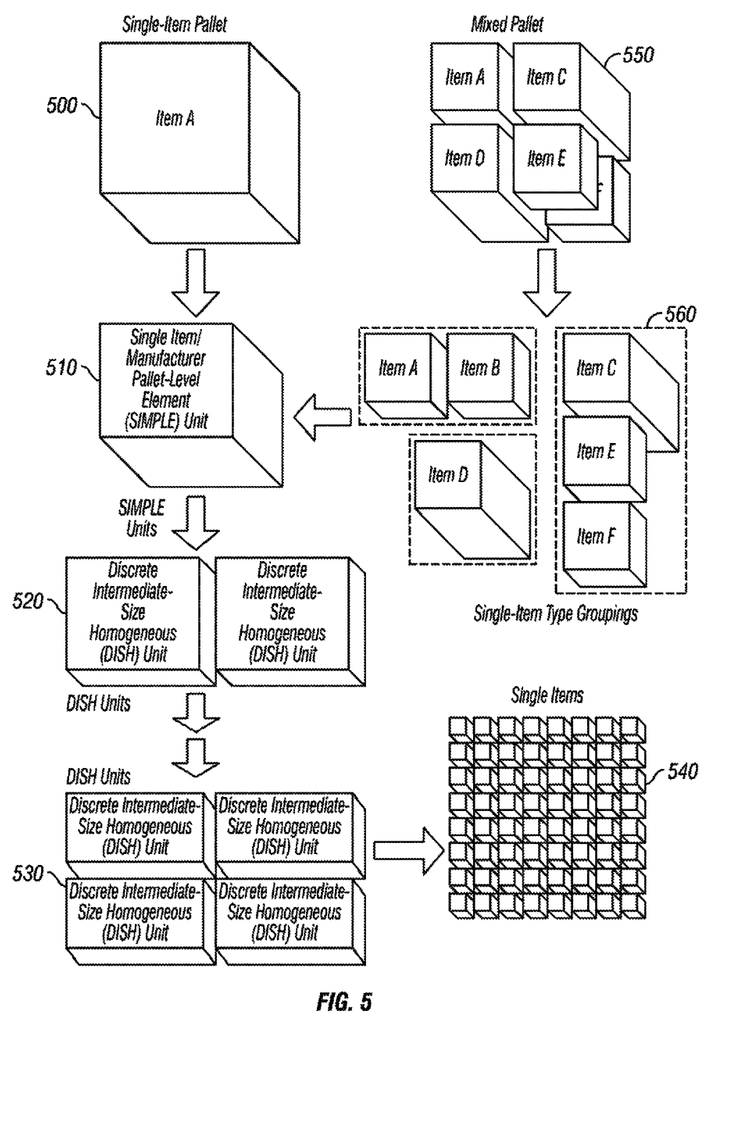
FIG. 5 shows a supply chain inference model based on a pallet and its association with individual items in accordance with an example embodiment.

FIG. 5 shows a supply chain inference model based on a pallet and its association with individual items in accordance with an example embodiment. A single-item pallet 500 (Item A) is defined a single item/manufacturer pallet level element (SIMPLE unit 510. The SIMPLE units multiple discrete intermediate size homogenous (DISH) units 520 and 530 which include a plurality of single items 540. A mixed pallet 550 (shown with Item A, Item C, Item D, and Item E) are divided into single-item groupings 560 (shown in one group as Items A and B; a second group as Items C, E, and F; and a third group as item D).

In FIG. 5, single-item pallets 500 are treated differently from mixed pallets 550. Many RFID-based tracking systems use a single RFID or other identifier on the pallet, regardless of how the pallet is packed. Instead of using such a single RFID identifier, one example embodiment defines the set of all like or similar items (deemed a "single item-type grouping") as a "SIMPLE" unit (SIMPLE=Single Item/Manufacturer Pallet-Level Element). This allows a separate inference model for all items belonging to the same class or grouping, if the other considerations (cost, regulations, feasibility, customer needs, etc.) support this grouping.

Additionally, any number of logical subdivisions of the SIMPLE units, aggregating no less than 2 single items apiece, is defined as discrete intermediate-sized homogeneous (DISH) units. Note that, in some cases (e.g. large items so that there are only several items per pallet, or low-cost items for which individual tracking is not cost-efficient), no DISH units will logically exist between the SIMPLE and single units.

However, the flexibility in the SIMPLE-DISH model for inference will underpin five systems of inference described below with reference to FIG. 4 showing a SIMPLE-DISH Inference Model.

1. Inference Model

The inference model includes how tracking is performed; how items are refer or link to their parents and/or children in the supply chain; and how such associated items are associated in a registry (e.g., a database used for storing inference, tracking, authentication, forensic and other relevant data for the supply chain model).

2. Device/Data-Holder On/Off Ramp

The proposed system provides flexibility in terms of how DISH units are logically defined. For example, if the pallet contains 480 cartons of cigarettes, with 30 cartons in each of 16 boxes, and 20 packs of cigarettes in each case, each pack containing 20 cigarettes, then DISH units of the following sizes could exist DISH-1: box of 30 cartons=30×20×20=12,000 single units
DISH-2: carton of 20 packs=20×20=400 single units
DISH-3: pack of 20 cigarettes=20 single units.

The overall SIMPLE unit contains 16×12,000=192,000 cigarettes in this example. The SIMPLE-DISH inference model therefore can be described as a [16, 30, 20, 20] model, meaning 20 items belong to each of 20 DISH-3 units, 20 DISH-3 units belong to each of 30 DISH-2 units, 30 DISH-2 units belong to each of 16 DISH-1 units, and the 16 DISH-1 units comprise the SIMPLE unit. The "device" or "data holder" at each level in the SIMPLE-DISH model can be chosen from RFID, printed label or other printed feature, print forensics nanotaggant, or any other reliable means of recording/reading information. This flexibility allows the supply chain manager to select device/data-holder based on the various cost factors discussed below.

3. Cost Model

The costs considered in selecting device/data-holders include the following:

a. Cost of items: How much does each level of SIMPLE and DISH unit cost versus how much the device/data-holder costs?

b. Cost of checking (visibility): How much does it cost to interrogate each device/data-holder from manufacturer to end-used (if the difference between the cost of checking is greater than the difference in device cost, then the higher-device cost, lower checking-cost should be chosen)?

c. Cost of not checking (non-visibility): What is the cost of a device/data-holder failure?

d. Cost of devices: Discussed above.

e. Cost of integration, maintenance (update, archival, etc.): Related to the cost of checking above. How much does it cost to implement any additional device/data holder systems? Additionally, consideration can be given to the relative costs of the RAD, printing and checking can be used to minimize the overall costs for a given pallet.

4. Association Model Within Like Units

How are elements within a SIMPLE or DISH unit related?

a. For EPC global numbers, are there differences in the variable fields related to DISH/SIMPLE units?

b. For fiducial-mark based data-holders (such as printed forensics, nanotaggants, etc.), are there different fiducial marks used for different units in a set?

c. Can different deterrents among a set of deterrents be used for each SIMPLE/DISH unit?

d. Is a different combination of nanotaggants usable for each of a set of SIMPLE/DISH units?

5. Regulatory. Auditing and Compliance

How are the association models discussed above used to meet regulatory concerns, including auditing and data standards? Does this change any of the other expenses?

In each of these fives cases, the model illustrated in FIG. 5 provides a framework for comparing and contrasting overall system costs.

The methods apparatus in accordance with example embodiments are provided as examples and should not be construed to limit other embodiments within the scope of the invention. Further, methods or steps discussed within different figures can be added to or exchanged with methods of steps in other figures. Further yet, specific numerical data values (such as specific quantities, numbers, categories, etc.) or other specific information should be interpreted as illustrative for discussing example embodiments. Such specific information is not provided to limit example embodiments.

The above discussion is meant to be illustrative of the principles of various example embodiments. Numerous variations and modifications will become apparent to those skilled in the art once the above disclosure is fully appreciated. It is intended that the following claims be interpreted to embrace all such variations and modifications.

What is claimed is:

1. An apparatus, comprising:
   a surface that includes a two dimensional barcode and a Radio Frequency Identification (RFID) antenna printed on the two dimensional barcode, wherein the RFID antenna and the two dimensional barcode are formed from a conductive ink,
   wherein every portion of the RFID antenna is formed over an ink portion of the two dimensional barcode, such that the RFID antenna is hidden within the two dimensional barcode.

2. The apparatus of claim 1, wherein the RFID antenna and the two dimensional barcode are formed from a same conductive ink.

3. The apparatus of claim 1, wherein ink that forms the RFID antenna is deposited on ink that forms the two dimensional barcode.

4. The apparatus of claim 1, wherein the RFID antenna is a closed loop that is deposited only in black ink areas of the two dimensional barcode.

5. The apparatus of claim 1, wherein the RFID antenna and the two dimensional barcode are both printed with a single pre-conductive ink that is applied in an electrically non-conductive state and then cured to an electrically conductive state.

6. A Radio Frequency Identification (RFID) device, comprising:
   an antenna with a plurality of closed loops formed from a conductive ink; and
   a barcode formed from the conductive ink, wherein the antenna is deposited on top of the barcode,
   wherein the closed loops have a size such that one or more of:
   the closed loops are ignored b a barcode reader;
   a signal generated by the closed loops is corrected with error-correcting code (ECC).

7. The RFID device of claim 6, wherein the closed loops of the antenna have shapes that follow ink deposits that form the barcode.

8. The RFID device of claim 6, wherein the closed loops of the antenna and the barcode are both formed from a same transparent conductive ink that includes Indium Tin Oxide.

9. A method, comprising:
   depositing an electrically conductive ink on a surface of an apparatus to form a barcode; and depositing the electrically conductive ink on the surface and on top of the barcode to form an antenna, wherein every portion of the antenna is deposited on an ink portion of the barcode, such that the antenna is hidden within the barcode.

10. The method of claim 9, wherein the barcode and antenna are printed together in a single pass.

11. The method of claim 9 further comprising, curing the ink of the barcode and loops for the antenna to transform the ink from an electrically non-conductive state to an electrically conductive state.

12. The method of claim 9 further comprising, creating electrically conductive pathways for loops of the antenna on the surface where printed elements of the barcode co-exist.

13. The method of claim 9, wherein loops of the antenna have non-circular shapes that that follow a pattern created by the barcode and include an L-shape of the barcode.

* * * * *

UNITED STATES PATENT AND TRADEMARK OFFICE
CERTIFICATE OF CORRECTION

| | | |
|---|---|---|
| PATENT NO. | : 9,251,459 B2 | Page 1 of 1 |
| APPLICATION NO. | : 13/808955 | |
| DATED | : February 2, 2016 | |
| INVENTOR(S) | : Steven J. Simske et al. | |

It is certified that error appears in the above-identified patent and that said Letters Patent is hereby corrected as shown below:

In the Claims

In column 6, line 56, in Claim 6, delete "ignored b" and insert -- ignore by --, therefor.

In column 7, line 16, in Claim 13, delete "that that" and insert -- that --, therefor.

Signed and Sealed this
Nineteenth Day of July, 2016

Michelle K. Lee
*Director of the United States Patent and Trademark Office*